(12) United States Patent
Grover (10) Patent No.: US 12,461,715 B2
(45) Date of Patent: Nov. 4, 2025

(54) METHODS AND APPARATUS FOR FACILITATING USAGE OF DEVELOPMENT ENVIRONMENTS FOR COMPUTER PROGRAMMING WITH CONVERSATIONAL ARTIFICIAL INTELLIGENCE

(71) Applicant: Radhika Grover, San Jose, CA (US)

(72) Inventor: Radhika Grover, San Jose, CA (US)

(73) Assignee: Radhika S. Grover, San Jose, CA (US)

( * ) Notice: Subject to any disclaimer, the term of this patent is extended or adjusted under 35 U.S.C. 154(b) by 277 days.

(21) Appl. No.: 18/117,382

(22) Filed: Mar. 3, 2023

(65) Prior Publication Data

US 2024/0296016 A1 Sep. 5, 2024

(51) Int. Cl.

| | |
|---|---|
| *G06F 8/33* | (2018.01) |
| *G06F 3/01* | (2006.01) |
| *G06F 8/30* | (2018.01) |
| *G06F 8/73* | (2018.01) |
| *G06F 8/75* | (2018.01) |
| *G06F 40/289* | (2020.01) |
| *G10L 15/06* | (2013.01) |
| *G10L 15/18* | (2013.01) |
| *G10L 15/22* | (2006.01) |
| *G10L 15/08* | (2006.01) |

(52) U.S. Cl.
CPC ............... *G06F 8/30* (2013.01); *G06F 3/017* (2013.01); *G06F 40/289* (2020.01); *G10L 15/063* (2013.01); *G10L 15/18* (2013.01); *G10L 15/22* (2013.01); *G06F 8/33* (2013.01); *G06F 8/75* (2013.01); *G10L 2015/0635* (2013.01); *G10L 2015/088* (2013.01); *G10L 2015/223* (2013.01)

(58) Field of Classification Search
CPC ..... G06F 8/30; G06F 8/33; G06F 8/75; G06F 40/289; G06F 3/017; G10L 15/063; G10L 15/18; G10L 15/22; G10L 2015/0635; G10L 2015/088; G10L 2015/223

See application file for complete search history.

(56) References Cited

U.S. PATENT DOCUMENTS

| | | | |
|---|---|---|---|
| 2004/0044516 A1* | 3/2004 | Kennewick | G10L 15/1822 704/E15.04 |
| 2004/0083092 A1* | 4/2004 | Valles | G06F 40/30 704/9 |
| 2020/0097261 A1* | 3/2020 | Smith | G06F 40/174 |

(Continued)

OTHER PUBLICATIONS

Dvait Sarkar et al., What is it like to program with artificial intelligence?, Oct. 17, 2022, [Retrieved on Mar. 7, 2025]. Retrieved from the internet: <URL: https://arxiv.org/pdf/2208.06213> 27 Pages (1-27) (Year: 2022).*

(Continued)

*Primary Examiner* — Anibal Riveracruz (57) ABSTRACT

Classification and preprocessing algorithms are applied to at least one reference document and a natural language command provided as input by a user to a development environment for computer programming. Approximate matching of keywords in user commands with data in the reference document is performed with a fuzzy hash map and used to develop information metrics that produce a ranking of candidate actions. Selection criteria are then used to select an action from multiple candidate actions to perform the desired operation in the development environment.

24 Claims, 7 Drawing Sheets

(56) References Cited

U.S. PATENT DOCUMENTS

| | | | |
|---|---|---|---|
| 2020/0117446 A1* | 4/2020 | Smith | G06F 8/71 |
| 2024/0201983 A1* | 6/2024 | Groenewegen | G06F 8/20 |
| 2024/0281219 A1* | 8/2024 | Masad | G06F 8/33 |

OTHER PUBLICATIONS

Stephan Bisser, Microsoft Conversational AI Platform for Developers, 2021, [Retrieved on Aug. 2, 2025]. Retrieved from the internet: <URL: https://link.springer.com/content/pdf/10.1007/978-1-4842-6837-7.pdf> 292 Pages (1-292) (Year: 2021).*

* cited by examiner

METHODS AND APPARATUS FOR FACILITATING USAGE OF DEVELOPMENT ENVIRONMENTS FOR COMPUTER PROGRAMMING WITH CONVERSATIONAL ARTIFICIAL INTELLIGENCE

FIELD OF THE INVENTION

The present invention relates in general to development environments for computer programming. More particularly, the present invention relates to techniques for determination of one or more actions to be performed by a development environment for computer programming in response to natural language commands provided as input to it.

BACKGROUND OF THE INVENTION

Development environments can have complex graphical user interfaces and it can be difficult to manually search through this interface to find the menu item that implements the desired functionality. In addition, the programmer may need to perform operations related to programming that are not available in the graphical user interface of the development environment. There are no research or commercial prototypes programming development environments that can be controlled with conversational artificial intelligence available currently. Current research in this area has focused on Wizard of Oz studies to develop models for programming [1] or natural language for programming [2]. In [3], the authors describe a system called VoiceCode that uses voice commands to type code and compile code; however, this system does not support conversational AI. Commercial programming IDEs include Eclipse [4], Jupyter NoteBook [5], RStudio [6], Visual Studio Code [7], Rhyme Studio [8] and NetBeans [9]. Plugins for accessibility have been investigated for some of these IDEs to improve comprehensibility and navigation within a program. To improve accessibility in Eclipse, hierarchical tree-like structures have been researched for better navigation within code blocks in Eclipse [10, 11]. Other research work has focused on the addition of auditory outputs while debugging a program in NetBeans and Visual Studio [12, 14, 15] and to convey the nesting level of program statements [13]. Jupyter notebooks support a limited set of voice commands to improve accessibility for users with disabilities ("Run", "Shutdown Kernel", "Spell Checkers on", and "Show Planner") [16].

The present invention will help to make programming more accessible for all users including those with disabilities. Some examples of the commands that may need to be executed in the development environment for computer programming are described next.
Perform Operations Such as Reading and Running the Program
    "Read the second line of the program"
    "Read the line the cursor is currently on"
    "Run the program"
    "What is the program output?"
Perform Operations on Files
    "Correct the spelling of a word"
    "Correct indentation in the program"
    "Change line delimiters to linux"
    "Position the cursor on a given line number"
Perform Operations Such as Editing the Program
    "Correct the spelling of a word"
    "Correct indentation in the program"
    "Undo the last change"
    "Redo the last change"
    "Cut selected text"
    "Undo what I typed"
Perform Search and Replace Operations
    "Find the word 'input'"
    "Find the function named 'print'"
    "Replace all occurrences of 'word1' with 'word2'"
Provide Contextual Information about the Program
    "Find the first method in the program"
    "What are all the functions in the program?"
    "Give a summary of the functions in the program"
    "Find which line is the cursor on"
    "Find how many lines are in the program"
Describe Errors in the Program
    "Find the first error in the program"
    Type code at the desired position in the editor
    "Go to the next line"
    "Type 'i=10'"
    "Type 'for i=1:10'"
Get Documentation
    "What does the function sqrt do?"
    "What methods does this class have?"

Thus, it is advantageous to provide techniques for the automatic processing of natural language commands given to the development environment of computer programming while overcoming the limitations of prior art techniques.

SUMMARY OF THE INVENTION

A method and apparatus to determine one or more actions to be performed by a programming environment for computer programming in response to natural language commands provided as input to the development environment. It teaches the application of classification and machine learning algorithms to natural language commands provided as input to a development environment used in computer programming in order to determine at least one action to be performed by the development environment. For example, this at least one action can be used to extract information about the contents (such as computer programs and their files) of the development environment and perform operations on its contents (such as execute programs and save files). In one embodiment of the present invention, a preprocessing algorithm uses data in a reference document pertaining to the development environment to create fuzzy hash maps and other data structures. Then a classification algorithm extracts the keywords in the natural language command, uses approximate matching and other techniques to obtain information metrics and their weights for candidate actions that correspond to the extracted keywords, and selects one or more of the candidate actions to be executed based on ranking and selection criteria. Input commands are obtained interactively from a user to further refine and improve the selection of candidate actions. A machine learning algorithm is used to update the information metrics and weights. Thus, the present invention provides techniques that are implemented in an automated manner, to allow a user to program with greater ease.

DETAILED DESCRIPTION OF THE PRESENT EMBODIMENTS

Figure 1:
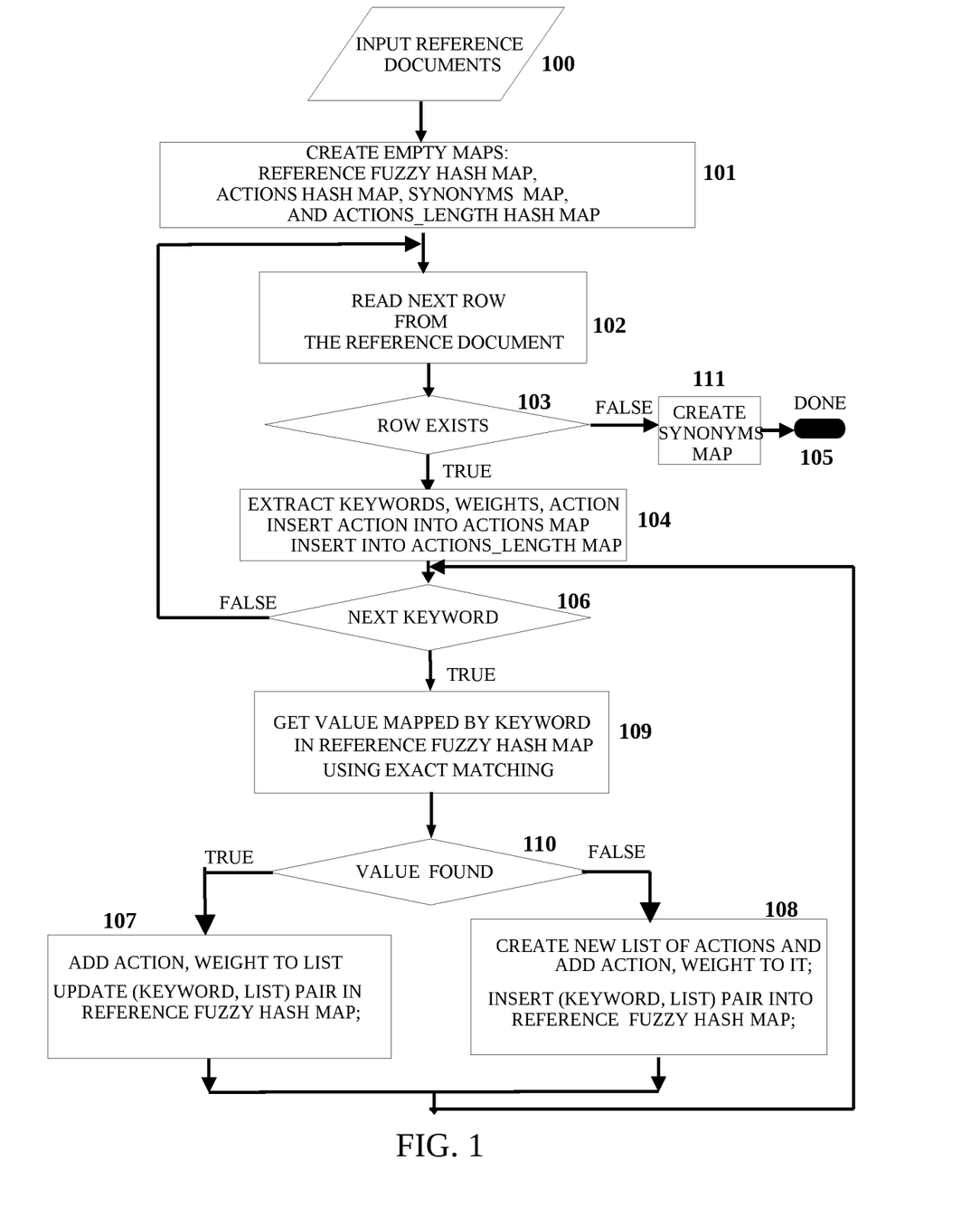
FIG. 1 is a flowchart illustrating the preprocessing algorithm in accordance with one embodiment of the present invention.

Referring now to FIG. 1, a preprocessing algorithm in accordance with an embodiment of the present invention is described in a flowchart. One or more reference documents 100 stored in machine readable form are provided as input to this algorithm. The preprocessing algorithm reads the data in the reference document to create data structures that will be used by a classification algorithm described in FIG. 2. In a presently preferred embodiment, the processing of the various embodiments of the present invention as exemplified in FIG. 1, is carried out using one or more suitably programmed computers or equivalents thereof.

The reference documents 100 contain phrases, synonyms, and associated actions that describe the desired functionality of the development environment. The reference documents 100 can be obtained by various means including gathering information from users who are using the development environment, and the graphical user interface and documentation of the development environment. An action comprises of the execution of a function or a sequence of functions in the development environment or software-initiated pressing of keyboard keys to perform a desired operation in the development environment in response to the user command. For example, suppose that the development environment provides a file menu item in its graphical user interface (GUI) that can be used to open a new Java project. Furthermore, suppose that the at least one reference document stores the relevant information for this menu item with the following phrases, and weights that are separated by commas (although other delimiters such as newlines may be used as well):

file, 1, new, 1, java project, 1, functionA

In our discussion, we assume that a phrase contains one or more words. In this example, the phrases are file, new, and java project and each phrase is followed by its weight. The weight indicates the importance of that phrase because the same phrase may have greater importance for identifying one action and have less importance for another. Here, an initial weight of 1 is provided by the user for each phrase. In a presently preferred embodiment of the invention, the weights are in the range of 0 to 1, although other ranges may be used as well, and these weights will be updated later by a machine learning algorithm. The action associated with the command is given by functionA, and this may be a function name or an identification number of a function or function sequence. A separate hash map may be used to store function identification numbers and their associated function names. In a present embodiment of the invention, the reference document 100 contains multiple rows and each row in the reference document 100 stores the phrases and their associated action as follows:

phrase 1, weight of phrase 1, phrase 2, weight of phrase 2, . . . , Action1

Other formats could be used for the reference document as well and it may contain other information such as the structure of each row and the total number of rows.

The words in a given user command have to be matched against those in the at least one reference document 100 to determine the desired action. Due to the large size of the at least one reference document, one problem is that it can be inefficient to search for each word in the user command and its synonyms through the entire reference document. A second problem is that the user command may not match exactly with the data provided in the reference document. For example, suppose that the user command is "converge line delimiter in file to window", where the word "convert" is misspelled as "converge". Suppose that the corresponding action is functionB and this data is stored in the reference document as "file, 0.5, convert line delimiters to, 1, windows, 1, functionB". The word converge does not have an exact match with the word convert, and so the corresponding action may not be matched. A third problem is that a word in a user command may map to more than one possible action (referred to candidate actions) out of which one action must be selected. For example, as the word "file" maps to both "functionA" and "functionB", these actions are referred to as candidate actions. Information metrics are needed to rank candidate actions, and selection criteria are needed to select an action from two or more candidate actions. In the following discussion, we will discuss how the preprocessing algorithm creates and updates several data structures. These data structures will then be used by the classification algorithm described in FIG. 2 for efficient processing of the words in the user command to determine information metrics for candidate actions and obtain a ranking of the candidate actions.

Initially, at least one of these empty maps, a reference fuzzy hash map, actions hash map, synonyms map, and actions_length hash map are created 101. The next row is read from the reference document 102. If the row exists 103, the individual words (referred to as keywords in the following discussion), their weights and corresponding action are extracted from the row 104. For example, suppose that the first row in the reference document 100 is "file, 1, new, 1, java project, 1, functionA". It is split into the keywords "file, 1, new, 1, java, 1, project, 1, functionA". In a present embodiment of the invention, the individual keywords of a phrase are assigned the same initial weight as the initial weight of the phrase. The action functionA may be assigned a numeric id, and the (id, function name) pair inserted into the actions map 104. Note that the words in the phrase have been split into individual keywords. If a keyword in a user command matches only a single word in a phrase with multiple words, then the entire phrase may not be matched in the reference fuzzy hash map. Therefore, the algorithm splits the phrases into individual words (referred to as keywords) and then inserts each of these keywords into the reference fuzzy hash map 106. The action_length map stores (action, count) pairs, where the count is the total number of phrases for a given action in the reference document. A new key-value pair is inserted in the action_length hash map where the action (or its id) is the key and the value is the number of phrases for that action 104. For example, the key-value pair (functionA, 3) is inserted into the action_length hash map because it has three phrases (file, new, java project). Each keyword is processed next 106. The value mapped by that keyword is retrieved from the reference hash map using a threshold of 0 109. Approximate matching techniques using fuzzy hash maps are described in [17]. The threshold value of 0 looks for an exact match of the keyword with a key in the reference fuzzy hash map. Higher threshold values for approximate matching are used in the classification algorithm, and this is described in the discussion for FIG. 2. If the value 110 is not present in the reference fuzzy hash map, a new list is created, the action and weight for that keyword are added to this list, and this (keyword, list) pair is inserted into the reference fuzzy hash map 108. For example, a new list is created for the keyword file and the key-value pair for the key file and value [(functionA, 1)] and inserted into the reference fuzzy hash map. A single keyword may have multiple actions associated with it. If the value 110 mapped by a keyword is already present in the reference fuzzy hash map, the value is updated by adding the new action, weight pair to it 107. For example, suppose that the reference document stores "file, 0.5, convert line delimiters to, 1, windows, 1, functionB". The key file is already present in the reference fuzzy hash map, and so its updated value becomes: [(functionA, 1), (functionB, 0.5)]. The weight for keyword "file" is higher in functionA than in functionB, which indicates that it is more important in identifying functionA, and other keywords may be more important in identifying functionB. After all the keywords for an action have been added to the reference fuzzy hash map, the next row is fetched 102 and the process is repeated. After all rows have been read from the reference document 100, the construction of the reference fuzzy hash map, actions hash map, and the action_length hash map is complete. The reference fuzzy hash map now contains (keyword, list) pairs for all keywords obtained from the reference document 100 and each list contains all the (action, weight) pairs for that keyword. A synonyms map stores key-value pairs where the key is a keyword or its synonym and the value is a list of its synonyms. It is constructed using different fuzzy matching thresholds for each keyword from the corresponding input reference document 100. One of the input reference documents 100 that stores synonyms is created by various means such as collecting data from users who are using the development environment, and from a thesaurus. After the synonyms map is created 111, the preprocessing algorithm terminates 105. In another embodiment of the present invention, other types of collections, such as tree maps, could be used for the data structures created by the preprocessing algorithm.

In FIG. 2A, FIG. 2B, FIG. 2C and FIG. 2D, a classification algorithm in accordance with an embodiment of the present invention is described in these flowcharts that are connected together using flowchart connectors. The classification algorithm processes a command that is input by a user 201, and selects one or more actions 235 to be performed by the development environment. The process can be repeated interactively whereby several candidate actions are presented to the user using natural language. The user can then choose one of the candidate actions or provide further information in a new command that is processed again using the classification algorithm to improve the previous results. In a presently preferred embodiment, the processing of the various embodiments of the present invention as exemplified in FIG. 2, is carried out using one or more suitably programmed computers or equivalents thereof.

Figure 2A:
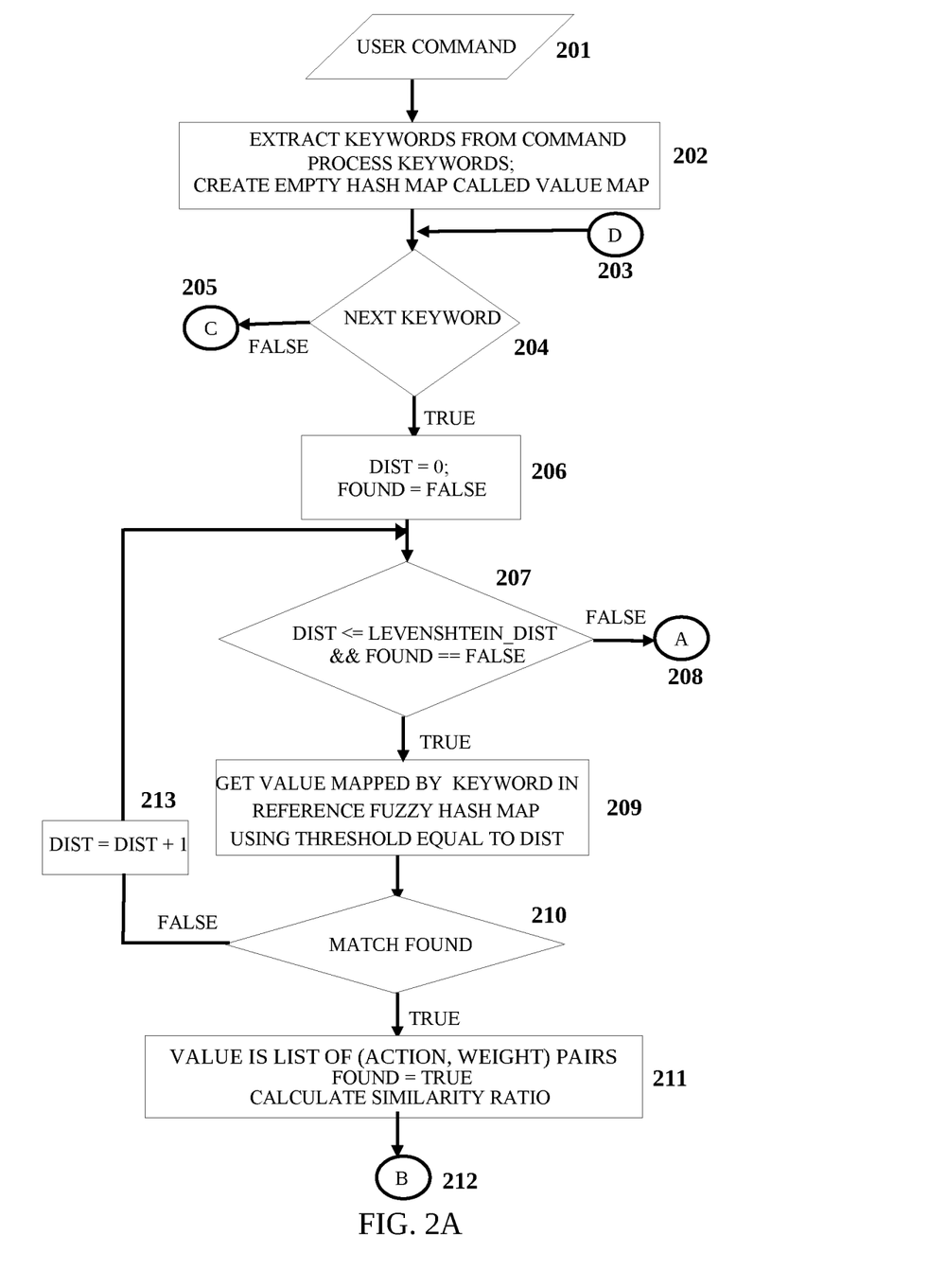
FIG. 2A, FIG. 2B, FIG. 2C, and FIG. 2D is a flowchart illustrating the classification algorithm in accordance with one embodiment of the present invention.

Referring now to FIG. 2A, a user command 201 is given by a user as input to the development environment. For example, suppose that the user command is "convert line delimiter in file to window", and it is desired to find the action in the development environment to execute this command. The user command is split into individual words (referred to as keywords in the following discussion) 202. A candidate action is an action that has been selected by one or more of the keywords in the user command by the classification algorithm. An empty hash map called Value map is also created 202 to store information metrics that are computed by the classification algorithm for each candidate action of the given user command 201. The extracted keywords may undergo processing 202 including string processing such as case-conversion and natural language processing using well-known techniques such as lemmatization, stemming, and tokenization [19]. For each keyword extracted from the command 204, the value mapped by that keyword is retrieved from the reference fuzzy hash map created using the preprocessing algorithm described in FIG. 1 209. The following discussion describes how threshold values obtained from approximate matching are used to determine information metrics for ranking the candidate actions. In a present embodiment of the invention, each keyword in the user's command string is matched with a key in the reference fuzzy hash map using the Levenshtein distance, although other approximate matching techniques such as Hamming distance could be used. The Levenshtein distance is a string metric to describe the difference between two strings. Informally, the Levenshtein distance between two words is the smallest number of insertions, deletions and substitutions that can change one word into the other [20].

The variable dist represents the Levenshtein distance used for approximate string matching, and it is initially set to 0 206. If a match 210 is not found for a given value of dist, dist is increased by 1 213 and the matching process is repeated until dist becomes greater than some predefined upper limit referred to as the levenshtein dist or a match is found 207. In a present embodiment of the invention, levenshtein_dist is set to 4. The boolean variable found is set to false for each keyword before the matching process starts 206, and it is set to true if a match is found 211. If the keyword is not matched in the reference fuzzy hash map, the matching process is repeated with each synonym of the keyword until a match is found, and this process is shown in the flowchart in FIG. 2B that is connected to this flowchart using the flowchart connector A 208. If there are no more synonyms of the keyword left to be evaluated, the flowchart in FIG. 2B returns processing to this flowchart through the connector D 203, and the next keyword in the user command is processed 204. If a value mapped by the keyword is found for some value of dist, an information metric called the similarity ratio is calculated for that keyword as follows 211:

1-dist/len where len is the length (number of characters) of the keyword.

Intuitively, if a match occurs with dist equal to 0, the similarity ratio is 1 indicating a perfect match; otherwise, as dist increases, the similarity ratio decreases indicating a worse match. After this step, the similarity ratio has to be updated for the actions that correspond to this keyword in Value map, and this process is shown in the flowchart in FIG. 2C that is connected to this flowchart using the flowchart connector B 212. After all the keywords have been processed 205, the candidate actions stored in Value map are ranked. This process for ranking is described in the flowchart described in FIG. 2D that is connected to this flowchart using the flowchart connector C 205. The keywords in the user command 202 can be processed in an order that is different from the order that they appear in the user command.

Figure 2B:
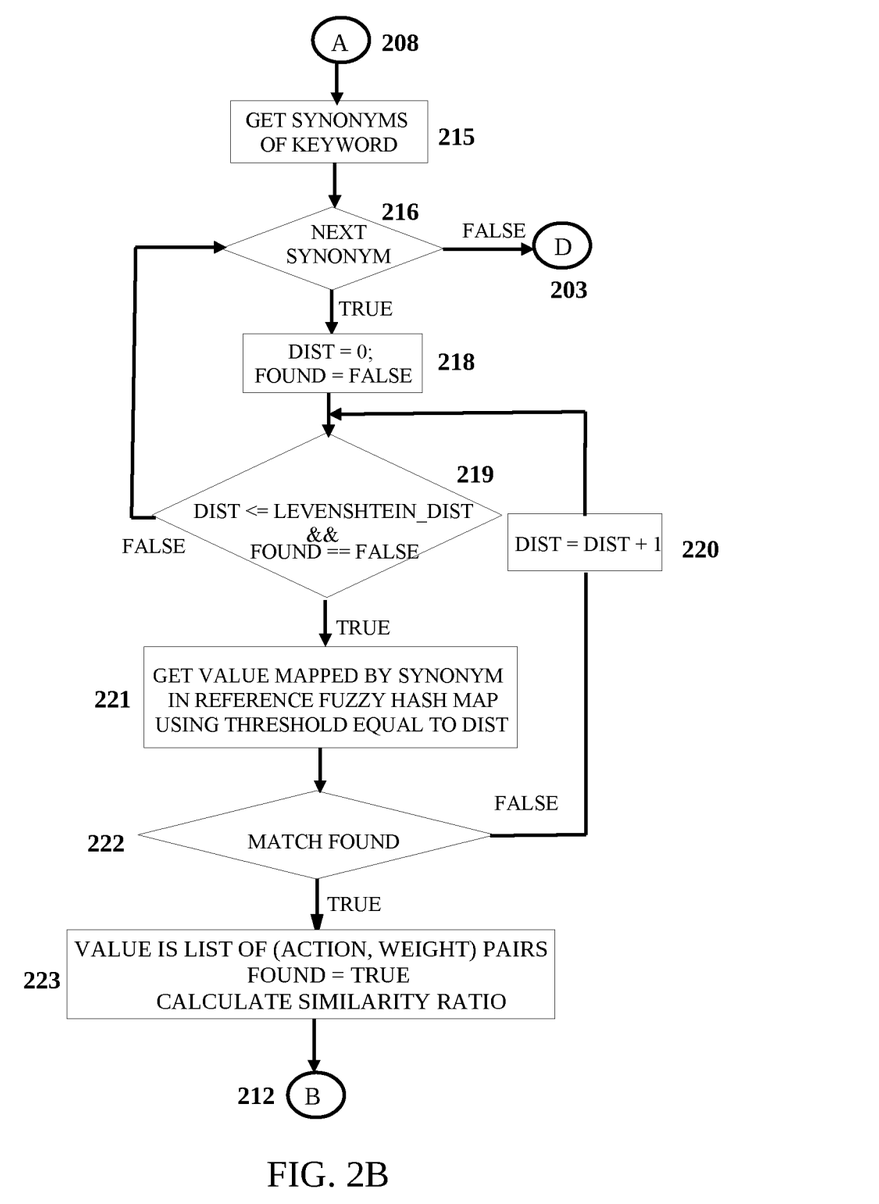

Referring now to FIG. 2B, the flowchart shows the processing from flowchart connector A 208 when the keyword in the user command is not matched in the reference fuzzy hash map in as discussed in FIG. 2A. Next, all the synonyms for that keyword are determined from the synonyms map that was created by the preprocessing algorithm shown in FIG. 1 215. The process used for matching the keywords described in FIG. 2A is now repeated for each synonym 216 of the keyword until the value mapped by the synonym is found in the reference fuzzy hash map 221. The variable dist represents the Levenshtein distance and it is initially set to 0 218. If a match 222 is not found for a given value of dist, dist is increased 220 and the matching process is repeated until dist becomes greater than some predefined upper limit referred to as the levenshtein_dist or a match is found 219. The boolean variable found is set to false for each keyword before the matching process starts 218, and it is set to true if a match is found 223. If a value mapped by the synonym is found for some value of dist 223, an information metric called the similarity ratio is calculated for that keyword as follows 223:

1-dist/len

Figure 2C:
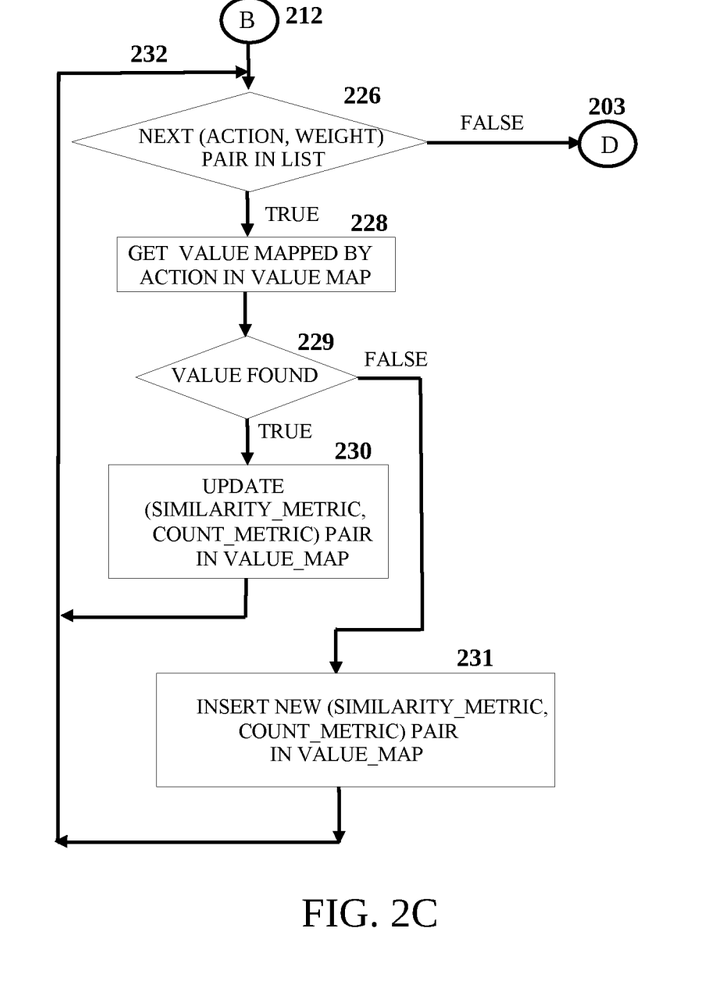

Here, len is the number of characters in the synonym. After this step, the similarity ratio has to be updated for the actions that correspond to this keyword in Value map, and this process is shown in the flowchart in FIG. 2C that is connected to this flowchart using the flowchart connector B 212. This flowchart is connected to the flowchart in FIG. 2A through the connector D 203 so that where there are no more synonyms of this keyword left to be processed, the next keyword in the user command can be processed. In another embodiment of the present invention, at least one or more synonyms of a keyword are processed as shown in FIG. 2C even when the keyword is present in the reference fuzzy hash map. In another embodiment of the present invention, the matching of keywords in the user command with the keys in the reference fuzzy hash map does not stop with with the first match found in the reference fuzzy hash map; instead, all values of dist from 0 to levenshtein_dist are used for each of the keywords in the user command to find new candidate actions.

Referring now to FIG. 2C, this flowchart is connected to the flowcharts in FIG. 2A and FIG. 2B using the flowchart connector B 212. The value obtained for the keyword in the user command 211 and for a synonym of that keyword 223 is processed here. Two information metrics called similarity_metric and count_metric are determined here for each candidate action. In the example described earlier, if the keyword being processed is "file", its value obtained from the reference fuzzy hash map is a list containing the (action, weight) pairs of [(functionA, 1), (functionB, 0.5)], and the similarity_ratio is 1 since this keyword is matched exactly in the reference fuzzy hash map. Each pair in this list of (action, weight) pairs is processed next 226 to determine information metrics for each of the candidate actions in the list. First, the value mapped by the action is retrieved from the value_map hash map 228. The value is a metric pair (similarity_metric and count_metric). If a value for that action does not exist 229, a new value with the pair (similarity_metric, count_metric) is created and inserted into value_map 231. In a present embodiment of the invention, a new similarity_metric is created as follows:

$$similarity\_metric = weight * similarity\_ratio$$

$$count\_metric = 1$$

For example, given the similarity_ratio of 1 for "file", the similarity_metric for functionA with a weight of 1 is 1, and the similarity_metric for functionB with a weight of 0.5 is 0.5. The count_metric for functionA and functionB is 1. The new (similarity_metric, count_metric) pairs mapped by functionA and functionB are inserted into value_map as follows: [(functionA, (1, 1)), (functionB, (0.5, 1))]

If a value mapped to an action is already present in the value_map 229, it is updated in the value_map 230. In a present embodiment of the invention, the similarity_metric and count_metric in the value mapped to that action are updated as follows:

$$new\_similarity\_metric = similarity\_ratio * similarity\_metric$$

$$new\_count\_metric = count\_metric + 1$$

$$similarity\_metric = new\_similarity\_metric$$

$$count\_metric = new\_count\_metric$$

Intuitively, the similarity_metric is higher (lower) when the similarity_ratio and the weight of the keywords mapped to that action is high (low). The count_metric keeps track of the number of keywords in the user command that were matched to the given action.

This process of updating the metrics in the value_map is repeated for each (action, weight) pair in the list mapped to the keyword 232. After all the entries in the list have been processed, the next keyword is fetched from the user command 204. This flowchart is connected to the flowchart in FIG. 2A using the flowchart connector D 203. After all the keywords in the user command have been processed, the value_map contains candidate actions with their information metrics.

Figure 2D:
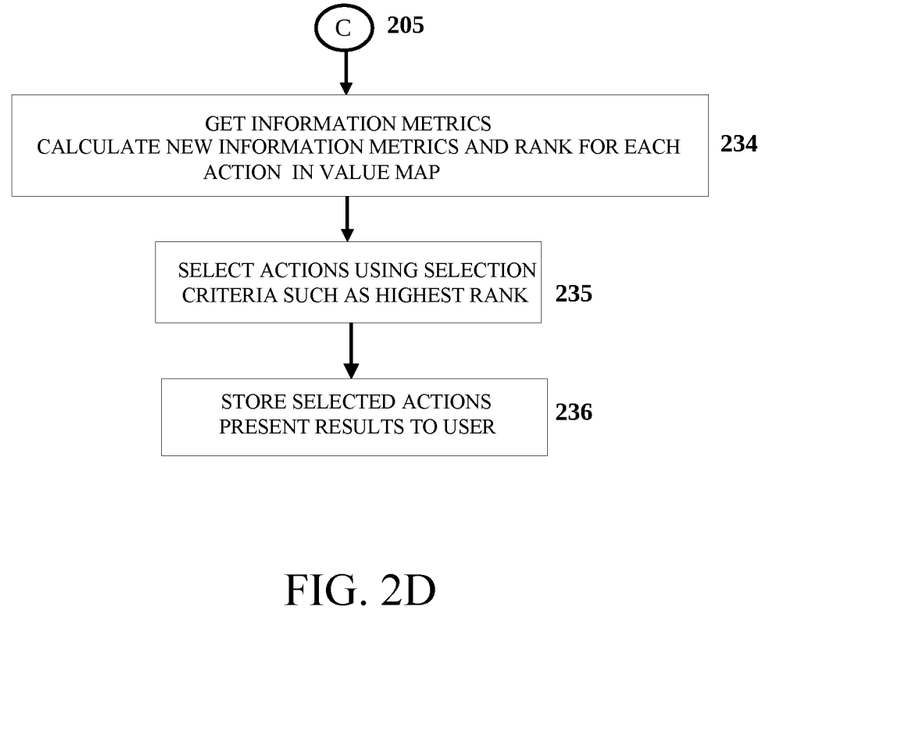

Referring now to FIG. 2D, two additional information metrics are determined for each candidate action in the value_map hash map, and the metrics are used to compute a rank for each candidate action 234. The length (total number of keywords and phrases) of each candidate action is obtained from action_length hash map and is referred to as numPhrases in the following discussion. In addition, the similarity_metric and the count_metric that are mapped to that candidate action are obtained from the value_map 234. Two additional information metrics are determined next for each candidate action 234:

$$numPhrasesNotMatchedInRow = numPhrases - count\_metric + eps$$

$$numPhrasesNotMatchedInCommand = commandLength - count\_metric + eps$$

Here eps is a very small fractional value that is used to prevent division by 0. numPhrasesNotMatchedInRow is the count of the number of words and phrases that are not matched for the given action in the reference document, numPhrasesNotMatchedInCommand is the count of the words and keywords that are not matched in the user command, and commandLength is the number of keywords in the user command.

In a present embodiment of the invention, the rank of each candidate action is calculated using:

$$rank = alpha * similarity\_metric * exp((beta * count\_metric) / ((gamma * numPhrasesNotMatchedInRow\_metric) * (delta * numPhrasesNotMatchedInCommand)))$$

where, exp is the exponential function, and alpha, beta, gamma and delta are the weights of the information metrics.

The values of alpha, beta, gamma and delta can be set to 1 initially, and updated by the machine learning algorithm. Intuitively, larger values of the similarity_metric and the count_metric, and smaller values of the numPhrasesNotMatchedInRow and NumPhrasesNotMatchedInCommand are preferable.

In one embodiment of the present invention, this process of determining the action for a given command can be done interactively, wherein the user is prompted for new information and the new command is processed by the classification algorithm to improve the previously obtained results 236. For example, suppose the user issues the following command:

"Save this file"

After the command is processed, two candidate actions "Save" and "Save as" that best match the current command are provided to the user and the information metrics associated with the candidate actions are saved for further processing:

"Do you want to save the file with the same name?" (Save action)

"Do you want to save the file with a different name?" (Save as action)

After the user selects one of the options, for example, by providing a new command "different name", the classification algorithm described in FIG. 2 is rerun on the saved candidate actions using the keywords in the new command to produce a new ranking of the candidate actions. This interactive process may occur a fixed number of times or until the value for a candidate action meets selection criteria such as a lower limit for the value of an action, user selection, or using some other criteria 235.

Figure 3:
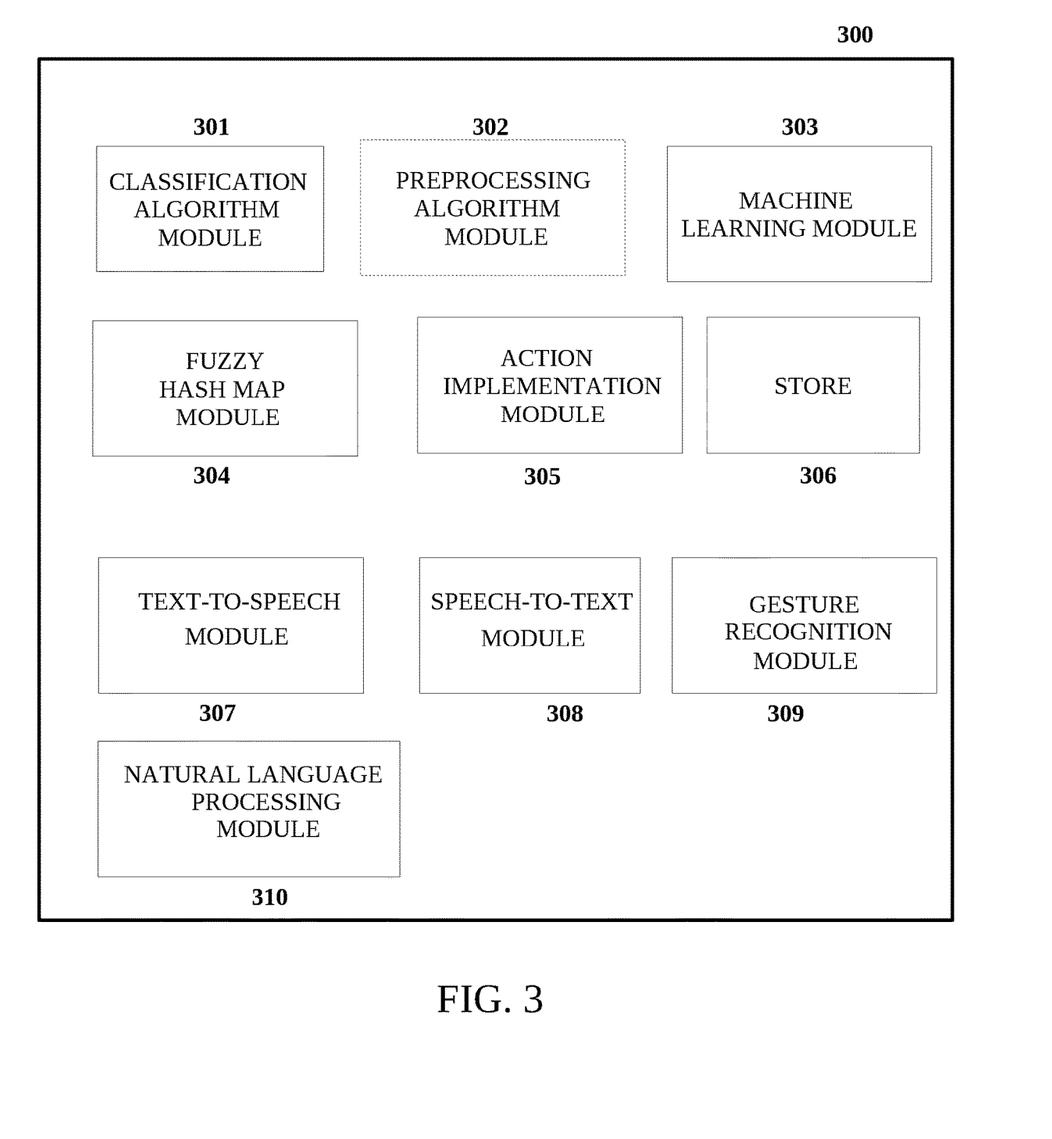
FIG. 3 is a block diagram of an implementation of the apparatus in accordance with the present invention.

Referring now to FIG. 3, an illustration of an implementation of the present invention is shown. In particular, an apparatus or device comprises of a classification algorithm module 301, a preprocessing algorithm module 302, a machine learning module 303, a fuzzy hash map module 304, an action implementation module 305, a store 306, a text-to-speech module 307, a speech-to-text module 308, a gesture recognition module 309, and a natural language processing module 310. The preprocessing algorithm module 302 contains algorithms to create the data structures 101 from the at least one or more reference documents 100 that contain relevant information about the development environment for computer programming. The classification algorithm module 301 contains algorithms to process the data structures that are created by the to process a user command 201 provided as input to the development environment for computer programming and select an action. The device may have an action implementation module 305 to perform the desired action. Alternately, it may store the information related to the desired action and the provide this information to the development environment, which may then perform the action. A user can input the command by typing it, speaking it out, or using one or more gestures. The speech-to-text module 308 contains algorithms such as [18] for speech recognition. The gesture recognition module 309 contains algorithms such as [21] for gesture recognition and is used to recognize the gestures input to the device. The device has access to a video camera, keyboard and microphone in order to input information through these various modalities. The natural language processing module 310 contains algorithms to process the user command in order to bring it into a suitable condition for the classification algorithm module 301. This processing comprises of stemming, tokenization, lemmatization, and case conversion [19]. The text-to-speech module 307 converts textual results of the processing from other algorithms in the device to speech. This option may be preferable to some users including those with visual impairments or blindness. The fuzzy hash map module 304 is an implementation of a fuzzy hash map that supports approximate matching of keys. A present embodiment of the invention uses an implementation of a fuzzy hash map described in [17]. The machine learning module 303 contains machine learning algorithms such as reinforcement learning that are used to modify the data structures, information metrics and their weights. A survey on machine-learning algorithms is provided in [22]. The store 306 is part of a computer system that is used to store all the information needed by the modules in the device to implement the various algorithms.

Figure 4:
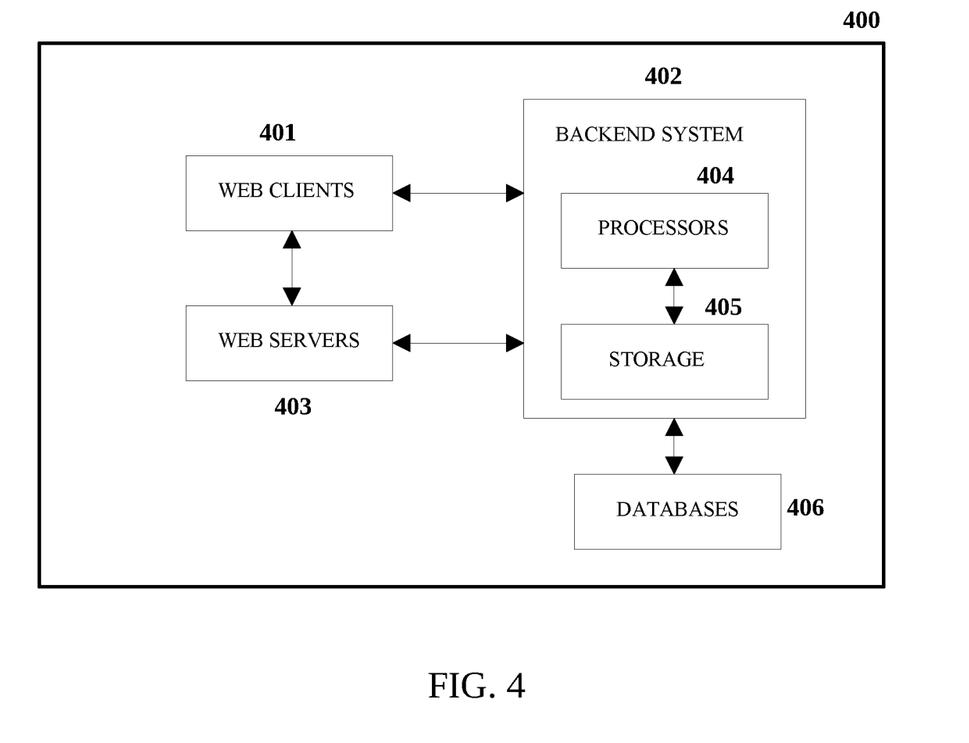
FIG. 4 is a block diagram illustrating a system that may be used in conjunction with an embodiment of the present invention.

The invention may be embodied in any of the following computing devices such as a desktop computer, a server computer, a web server computer, a tablet device, a laptop, and a smartphone. Referring now to FIG. 4, one type of system is shown in which the program for the development environment and the present invention is made available to web clients 401 through a web server 403 comprising of a backend system 402 with processors 404, storage 405, and a database 406.

As described above, the present invention provides a technique for automatically processing natural language commands. This is achieved by processing the data from the development environment and a natural language command with preprocessing and classification algorithms to classify the natural language command and determine an action to be performed by the development environment in response to the user command. For at least these reasons, the present invention represents an advancement over prior art techniques.

While the particular preferred embodiments of the present invention have been shown and described, it will be obvious to those skilled in the art that changes and modifications may be made, without departing from the teachings of the invention. It is therefore contemplated that the present invention cover any and all modifications, variations or equivalents that fall within the scope of the basic underlying principles disclosed above and claimed herein.

REFERENCES

[1] S. K. Kuttal, J. Myers, S. Gurka, D. Magar, D. Piorkowski and R. Bellamy, "Towards Designing Conversational Agents for Pair Programming: Accounting for Creativity Strategies and Conversational Styles," 2020 IEEE Symposium on Visual Languages and Human-Centric Computing (VL/HCC), Dunedin, New Zealand, 2020, pp. 1-11, doi: 10.1109/VL/HCC50065.2020.9127276.

[2] J. Van Brummelen, K. Weng, P. Lin and C. Yeo, "CONVO: What does conversational programming need?," 2020 IEEE Symposium on Visual Languages and Human-Centric Computing (VL/HCC), Dunedin, New Zealand, 2020, pp. 1-5, doi: 10.1109/VL/HCC50065.2020.9127277.

[3] A. Wali, Z. Haider, R. Fazal, A. Faraz and H. Hussain, "Enabling Programming for the Quadriplegic," 2018 5th International Multi-Topic ICT Conference (IMTIC), Jamshoro, Pakistan, 2018, pp. 1-5, doi: 10.1109/IMTIC.2018.8467250.Fuzzy Hash Map sourceforge.net

[4] Eclipse. 2021. [online] Available at: <https://www.eclipse.org/>

[5] Jupyter Notebook. 2021. [online] Available at: <https://jupyter.org>

[6] RStudio. 2021. [online] Available at: <https://rstudio.com/products/rstudio/features>

[7] Visual Studio. 2021. [online] Available at: <Code https://code.visualstudio.com>

[8] Rhyme. 2021. [online] Available at: <Studio https://rhyme.com>

[9] NetBeans. 2021. [online] Available at: <https://netbeans.apache.org/>

[10] Baker, C., Milne, L., Ladner, R. StructJumper: A Tool to Help Blind Programmers Navigate and Understand the Structure of Code. In Proceedings of the 33rd Annual ACM Conference on Human Factors in Computing Systems (CHI '15). Association for Computing Machinery, New York, NY, USA, 3043-3052.

[11] Smith, A., Cook, J., Francioni, J., Hossain, A., Anwar, M., and Rahman, M. 2003. Nonvisual tool for navigating hierarchical structures. In SIGACCESS Access. Comput. 77-78 (September 2003), 133-139.

[12] Palladino, D. and Walker, B. 2007. Learning rates for auditory menus enhanced with spearcons versus earcons. In Proc. of International Conference on Auditory Display (Montreal, Canada June 26-29, 2007) ICAD '07.

[13] Stefik, A., Hundhausen, C., and Patterson, R. 2011. An empirical investigation into the design of auditory cues to enhance computer program comprehension. In International Journal of Human-Computer Studies, 69 12, (December 2011), 820-838.

[14] A. Stefik and E. Gellenbeck, "Using spoken text to aid debugging: An empirical study," 2009 IEEE 17th International Conference on Program Comprehension, Vancouver, BC, Canada, 2009, pp. 110-119, doi: 10.1109/ICPC.2009.5090034.

[15] Lewis Berman, Keith Gallagher, Suzanne Kozaitis, "Evaluating the Use of Sound in Static Program Comprehension", ACM Transactions on Applied Perception, vol. 15, pp. 1, 2017.

[16] Accessibility Toolbar for Jupyter Notebooks. https://techcommunity.microsoft.com/t5/educator-developer-blog/accessibility-toolbar-for-jupyter-notebooks/ba-p/859622

[17] V. Topac, "Efficient fuzzy search enabled hash map," 4th International Workshop on Soft Computing Applications, Arad, Romania, 2010, pp. 39-44, doi: 10.1109/SOFA.2010.5565628.

[18] A. Elakkiya, K. J. Surya, K. Venkatesh and S. Aakash, "Implementation of Speech to Text Conversion Using Hidden Markov Model," 2022 6th International Conference on Electronics, Communication and Aerospace Technology, Coimbatore, India, 2022, pp. 359-363, doi: 10.1109/ICECA55336.2022.10009602.

[19] Emil Hvitfeldt and *Julia* Silge. Supervised Machine Learning for Text Analysis in R. Chapman & Hall/CRC Data Science Series, 2023.

[20] Frederic P. Miller, Agnes F. Vandome, and John McBrewster. 2009. Levenshtein Distance: Information theory, Computer science, String (computer science), String metric, Damerau?Levenshtein distance, Spell checker, Hamming distance. Alpha Press.

[21] S. Hussain, R. Saxena, X. Han, J. A. Khan and H. Shin, "Hand gesture recognition using deep learning," 2017 International SoC Design Conference (ISOCC), Seoul, Korea (South), 2017, pp. 48-49, doi: 10.1109/ISOCC.2017.8368821.

[22] K. K. Jha, R. Jha, A. K. Jha, M. A. M. Hassan, S. K. Yadav and T. Mahesh, "A Brief Comparison On Machine Learning Algorithms Based On Various Applications: A Comprehensive Survey," 2021 IEEE International Conference on Computation System and Information Technology for Sustainable Solutions (CSITSS), Bangalore, India, 2021, pp. 1-5, doi: 10.1109/CSITSS54238.2021.9683524.

The invention claimed is:

1. A computer-implemented method for processing user-issued commands expressed in a grammatically structured human language such as English and received via a development environment used for programming, the method comprising:

loading into memory at least one reference document comprising phrases, weights, and actions associated with programming tasks;

splitting each phrase in the reference document into its keywords;

creating a reference fuzzy hash map from the at least one reference document for the development environment for computer programming, wherein the reference fuzzy hash map stores, for each keyword in the reference document, a (key, value) pair comprising of the keyword as the key and a list of corresponding (action, weight) pairs of that keyword as the value;

obtaining the user-issued command through at least one of a keyboard module, speech recognition module and a gesture recognition module;

extracting from the user-issued command, a plurality of unique keywords;

identifying for each keyword of the plurality of keywords, a plurality of corresponding candidate actions using the fuzzy hash map;

determining information metrics and their weights for each candidate action of the plurality of candidate actions;

ranking each of the candidate actions using the information metrics and their weights;

selecting one or more of the candidate actions based on the ranking and selection criteria;

storing the one or more selected candidate actions; and executing the one or more selected candidate actions in the development environment.

2. The method of claim 1, further comprising:

performing a fuzzy match in the reference fuzzy hash map for each keyword in the plurality of unique keywords in the command using various distance values;

obtaining a list of candidate actions for the keyword; and for each action in the list of candidate actions, calculating its information metrics comprising of the distance values used for approximate matching of keys in the fuzzy hash map, a number of phrases matched between the command and the candidate action, a number of phrases not matched in the command, a number of phrases not matched in the candidate action, and a weight for each information metric.

3. The method of claim 2, further comprising:

using the weighted information metrics to calculate the ranking of all the candidate actions; and selecting at least one of the candidate actions using selection criteria.

4. The method of claim 3, further comprising:

a machine learning algorithm to update at least one of the reference fuzzy hash map, the information metrics and the weights associated with the information metrics.

5. An apparatus for processing user-issued commands expressed in a grammatically structured human language such as English and received via a development environment used for programming, the apparatus comprising:

a storage device to store at least one reference document comprising phrases, weights, and actions associated with programming tasks:

a fuzzy hash map creation module to split each phrase in the reference document into its keywords and create a reference fuzzy hash map from at least one reference document for the development environment, wherein the reference fuzzy hash map stores, for each keyword in the reference document, a (key, value) pair comprising of the keyword as the key and a list of corresponding (action, weight) pairs of that keyword as the value;

at least one of a keyboard module, speech recognition module and a gesture recognition module to input the user-issued command as text, speech or gestures;

a classification algorithm module implemented by a processor executing instructions stored by a storage device operative to extract from the user-issued command, a plurality of unique keywords;

identify for each keyword of the plurality of keywords, a plurality of corresponding candidate actions using the fuzzy hash map;

determine information metrics and their weights for each candidate action of the plurality of candidate actions;

rank each of the candidate actions using the information metrics and their weights;

select one or more of the candidate actions based on the ranking and selection criteria;

a machine readable store operative to store the one or more selected candidate actions; and an action implementation module to execute the one or more selected candidate actions in the development environment.

6. The apparatus of claim 5, wherein the classification algorithm module performs a fuzzy match in the reference fuzzy hash map for each keyword in the plurality of unique keywords in the command using various distance values;

obtains a list of candidate actions for the keyword; and for each action in the list of candidate actions, calculates its information metrics comprising of the distance values for approximate matching of keys in the fuzzy hash map, a number of phrases matched between the command and the candidate action, a number of phrases not matched in the command, a number of phrases not matched in the candidate action, and a weight for each information metric.

7. The apparatus of claim 6, wherein the classification algorithm module uses the weighted information metrics to calculate the ranking of all the candidate actions; and selects one of the candidate actions using selection criteria.

8. The apparatus of claim 7, further comprising:

a machine learning module updates at least one of the reference fuzzy hash map, the information metrics and the weights associated with the information metrics.

9. A non-transitory computer-readable medium having stored thereon executable instructions that, when executed, cause a computer to:

store at least one reference document comprising phrases, weights, and actions associated with programming tasks;

create a reference fuzzy hash map from at least one reference document comprising of phrases, weights and actions related to the development environment for programming, wherein the reference fuzzy hash map stores, for each keyword in the reference document, a (key, value) pair comprising of the keyword as the key and a list of corresponding actions and the weight of the keyword as the value;

obtain a user-issued command expressed in a grammatically structured human language such as English and received via a development environment used for programming through at least one of a keyboard module, speech recognition module and a gesture recognition module;

extract from the user-issued command, a plurality of unique keywords;

identify for each keyword of the plurality of keywords, a plurality of corresponding candidate actions using the fuzzy hash map;

determine information metrics and their weights for each candidate action of the plurality of candidate actions;

rank each of the candidate actions using the information metrics and their weights;

select one or more of the candidate actions based on the ranking and selection criteria;

store the one or more selected candidate actions; and execute the one or more selected candidate actions in the development environment.

10. The non-transitory computer-readable medium of claim 9, wherein the executable instructions that, when executed, cause the computer to:

perform a fuzzy match in the reference fuzzy hash map for each keyword in the plurality of unique keywords in the command using various distance values;

obtain a list of candidate actions for the keyword; and for each action in the list of candidate actions, calculate its information metrics comprising of the distance values used for approximate matching of keys in the fuzzy hash map, a number of phrases matched between the command and the candidate action, a number of phrases not matched in the command, a number of phrases not matched in the candidate action, and a weight for each information metric.

11. The non-transitory computer-readable medium of claim 10, wherein the executable instructions that, when executed, cause the computer to:

use the weighted information metrics to calculate the ranking of all the candidate actions; and select one of the candidate actions using selection criteria.

12. The non-transitory computer-readable medium of claim 11, wherein the executable instructions that, when executed, cause the computer to:

use a machine learning algorithm to update at least one of the reference fuzzy hash map, the information metrics, and the weights associated with the information metrics.

13. A computer-implemented method for processing user-issued commands expressed in a grammatically structured human language such as English and received via a development environment used for programming, the method comprising:

loading into memory at least one reference document comprising phrases, weights, and actions associated with programming tasks;

splitting each phrase in the reference document into its Keywords;

creating a reference fuzzy hash map from the at least one reference document for the development environment for computer programming, wherein the reference fuzzy hash map stores, for each keyword in the reference document, a (key, value) pair comprising of the keyword as the key and a list of corresponding (action, weight) pairs of that keyword as the value;

obtaining the user-issued command through at least one of a keyboard module, speech recognition module and a gesture recognition module;

extracting from the user-issued command, a plurality of unique keywords;

identifying for each keyword of the plurality of keywords, a plurality of corresponding candidate actions using the fuzzy hash map;

determining information metrics and their weights for each candidate action of the plurality of candidate actions;

ranking each of the candidate actions using the information metrics and their weights;

selecting one or more of the candidate actions based on the ranking and selection criteria;

interactively displaying the one or more selected candidate actions to a user and processing input from the user to further improve the ranking of candidate actions;

storing the one or more selected candidate actions: and executing the one or more selected candidate actions in the development environment.

14. The method of claim 13, further comprising:

performing a fuzzy match in the reference fuzzy hash map for each keyword in the plurality of unique keywords in the command using various distance values;

obtaining a list of candidate actions for the keyword; and for each action in the list of candidate actions, calculating its information metrics comprising of the distance values used for approximate matching of keys in the fuzzy hash map, a number of phrases matched between the command and the candidate action, a number of phrases not matched in the command, a number of phrases not matched in the candidate action, and a weight for each information metric.

15. The method of claim 14, further comprising:

using the weighted information metrics to calculate the ranking of all the candidate actions; and selecting at least one of the candidate actions using selection criteria.

16. The method of claim 15, further comprising:

a machine learning algorithm to update at least one of the reference fuzzy hash map, the information metrics and the weights associated with the information metrics.

17. An apparatus for processing user-issued commands expressed in a grammatically structured human language such as English and received via a development environment used for programming, the apparatus comprising:

a storage device to store at least one reference document comprising phrases, weights, and actions associated with programming tasks;

a fuzzy hash map creation module to split each phrase in the reference document into its keywords and create a reference fuzzy hash map from at least one reference document for the development environment, wherein the reference fuzzy hash map stores, for each keyword in the reference document, a (key, value) pair comprising of the keyword as the key and a list of corresponding (action, weight) pairs of that keyword as the value;

at least one of a keyboard module, speech recognition module and a gesture recognition module to input the user-issued command as text, speech or gestures;

a classification algorithm module implemented by a processor executing instructions stored by a storage device operative to extract from the user-issued command, a plurality of unique keywords;

identify for each keyword of the plurality of keywords, a plurality of corresponding candidate actions using the fuzzy hash map;

determine information metrics and their weights for each candidate action of the plurality of candidate actions;

rank each of the candidate actions using the information metrics and their weights;

select one or more of the candidate actions based on the ranking and selection criteria; interactively display the one or more selected candidate actions to a user and process input from the user to further improve the ranking of candidate actions;

a machine readable store operative to store the one or more selected candidate actions; and an action implementation module to execute the one or more selected candidate actions in the development environment.

18. The apparatus of claim 17, wherein a classification algorithm module performs a fuzzy match in the reference fuzzy hash map for each keyword in the plurality of unique keywords in the command using various distance values;

obtains a list of candidate actions for the keyword; and for each action in the list of candidate actions, calculates its information metrics comprising of the distance values used for approximate matching of keys in the fuzzy hash map, a number of phrases matched between the command and the candidate action, a number of phrases not matched in the command, a number of phrases not matched in the candidate action, and a weight for each information metric.

19. The apparatus of claim 18, wherein the classification algorithm module uses the weighted information metrics to calculate the ranking of all the candidate actions; and selects one of the candidate actions using selection criteria.

20. The apparatus of claim 19, further comprising:

a machine learning module updates at least one of the reference fuzzy hash map, the information metrics and the weights associated with the information metrics.

21. A non-transitory computer-readable medium having stored thereon executable instructions that, when executed, cause a computer to:

store at least one reference document comprising phrases, weights, and actions associated with programming tasks;

create a reference fuzzy hash map from at least one reference document comprising of phrases, weights and actions related to the development environment for programming, wherein the reference fuzzy hash map stores, for each keyword in the reference document, a (key, value) pair comprising of the keyword as the key and a list of corresponding actions and the weight of the keyword as the value;

obtain a user-issued command expressed in a grammatically structured human language such as English and received via a development environment used for programming through at least one of a keyboard module, speech recognition module and a gesture recognition module;

extract from the user-issued command, a plurality of unique keywords;

identify for each keyword of the plurality of keywords, a plurality of corresponding candidate actions using the fuzzy hash map;

determine information metrics and their weights for each candidate action of the plurality of candidate actions;

rank each of the candidate actions using the information metrics and their weights;

select one or more of the candidate actions based on the ranking and selection criteria;

store the one or more selected candidate actions;

interactively display the one or more selected candidate actions to a user and process input from the user to further improve the ranking of candidate actions; and execute the one or more selected candidate actions in the development environment.

22. The non-transitory computer-readable medium of claim 21, wherein the executable instructions that, when executed, cause the computer to:

perform a fuzzy match in the reference fuzzy hash map for each keyword in the plurality of unique keywords in the command using various distance values;

obtain a list of candidate actions for the keyword; and for each action in the list of candidate actions, calculate its information metrics comprising of the distance values used for approximate matching of keys in the fuzzy hash map, a number of phrases matched between the command and the candidate action, a number of phrases not matched in the command, a number of phrases not matched in the candidate action, and a weight for each information metric.

23. The non-transitory computer-readable medium of claim 22, wherein the executable instructions that, when executed, cause the computer to:

use the weighted information metrics to calculate the ranking of all the candidate actions; and select one of the candidate actions using selection criteria.

24. The non-transitory computer-readable medium of claim 23, wherein the executable instructions that, when executed, cause the computer to:

use a machine learning algorithm to update at least one of the reference fuzzy hash map, the information metrics, and the weights associated with the information metrics.

* * * * *